(12) United States Patent  (10) Patent No.: US 9,254,711 B2
Ratgen  (45) Date of Patent: Feb. 9, 2016

(54) WHEEL RIM WITH HUB PLATE

(71) Applicant: Tyre Trade DK ApS, Vejen (DK)

(72) Inventor: Felix Paludan Ratgen, Vejen (DK)

(73) Assignee: Tyre Trade DK ApS, Vejen (DK)

( * ) Notice: Subject to any disclaimer, the term of this patent is extended or adjusted under 35 U.S.C. 154(b) by 93 days.

(21) Appl. No.: 14/357,607

(22) PCT Filed: Nov. 12, 2012

(86) PCT No.: PCT/DK2012/050414
§ 371 (c)(1),
(2) Date: May 12, 2014

(87) PCT Pub. No.: WO2013/068018
PCT Pub. Date: May 16, 2013

(65) Prior Publication Data
US 2014/0361603 A1  Dec. 11, 2014

(30) Foreign Application Priority Data
Nov. 11, 2011  (DK) .................................. 2011 70617

(51) Int. Cl.
*B60B 3/08* (2006.01)
*B60B 3/04* (2006.01)
*B60B 23/12* (2006.01)
*B21D 53/30* (2006.01)
*B60B 3/00* (2006.01)
*B60B 23/06* (2006.01)

(52) U.S. Cl.
CPC ................ *B60B 3/041* (2013.01); *B21D 53/30* (2013.01); *B60B 3/004* (2013.01); *B60B 3/04* (2013.01); *B60B 23/06* (2013.01); *B60B 23/12* (2013.01);

(Continued)

(58) Field of Classification Search
CPC ................ B60B 3/08; B60B 3/12; B60B 3/14
USPC ............ 301/64.301, 64.302, 64.305, 64.306, 301/64.307, 64.5
See application file for complete search history.

(56) References Cited

U.S. PATENT DOCUMENTS 2,848,279 A * 8/1958 Parker, Sr. .............. B60B 25/16
152/384
3,802,744 A * 4/1974 Grawey .................. B60B 25/00
301/64.305

(Continued)

FOREIGN PATENT DOCUMENTS

EP  0 084 979 A2  8/1983
EP  0 572 876 A1  12/1993
FR  2 505 742 A1  11/1982

*Primary Examiner* — Jeffrey J Restifo
(74) *Attorney, Agent, or Firm* — Roberts Mlotkowski Safran & Cole, PC; David S. Safran

(57) ABSTRACT

The present invention concerns a wheel rim and a method for making a wheel rim of the type suited for use on an agricultural or construction vehicle. The new feature of the wheel rim according to the invention is that the central hub plate at the outer periphery includes a number of tabs extending away from the center of the central hub plate, where the second hub plate at its inner periphery also includes a number of tabs extending towards the center of the hub plate, where the tabs have a geometric shape such that the tabs fit between each other, where the tabs include holes arranged at the same pitch circle diameter and at right angles to the tabs. In connection with the making of the hub plate, the second hub plate and the central hub plate can be produced from a single piece of suitable material, preferably steel plate, as the mentioned tabs extend over each other when two parts are separated and turned such that the tabs come to lie upon each other. The two hub plate parts are then joined by bolts in the holes formed in the mentioned tabs.

12 Claims, 11 Drawing Sheets

(52) U.S. Cl.
CPC ..... *B60B 2310/208* (2013.01); *B60B 2310/226* (2013.01); *B60B 2310/30* (2013.01); *B60B 2360/102* (2013.01); *B60B 2900/116* (2013.01); *B60B 2900/541* (2013.01); *B60Y 2200/22* (2013.01); *B60Y 2200/41* (2013.01); *Y10T 29/49526* (2015.01)

(56) References Cited

U.S. PATENT DOCUMENTS

| | | | |
|---|---|---|---|
| 3,836,202 A | 9/1974 | Bonomo | |
| 3,950,033 A * | 4/1976 | Wilcox | B21D 53/26 29/894.344 |
| 4,279,446 A * | 7/1981 | Bushmeyer | B60B 3/002 301/20 |
| 6,000,762 A * | 12/1999 | Chang | B60B 3/08 152/DIG. 10 |
| 2001/0011842 A1* | 8/2001 | Rockl | B60B 3/12 301/35.632 |
| 2008/0054714 A1* | 3/2008 | Morrow | B60B 23/12 301/63.101 |
| 2010/0147428 A1* | 6/2010 | Lipper | B60B 3/08 152/399 |
| 2011/0095597 A1* | 4/2011 | Knowles | B60B 3/08 301/64.303 |
| 2014/0361603 A1* | 12/2014 | Ratgen | B60B 23/12 301/64.307 |

* cited by examiner

WHEEL RIM WITH HUB PLATE

BACKGROUND OF THE INVENTION

1. Field of the Invention

The present invention concerns a wheel rim and a method for making a wheel rim of the type suitable for use on an agricultural or construction vehicle, wherein the rim includes a rim ring for mounting a tyre and further including an at least two-part hub plate extending inside the rim ring, where the at least two-part hub plate includes a central hub plate including a number of holes and a contact surface for mechanical and detachable securing to a hub on a vehicle, wherein the central hub plate includes holes on a contact surface at the outer periphery for joining with a second hub plate with an inner periphery and an outer periphery, wherein the second hub plate at the inner periphery includes a contact surface with corresponding holes for joining with the central hub plate, where the second hub plate at the outer periphery includes holes for direct or indirect joining with the rim ring.

2. Description of Related Art

It is commonly known that wheel rims suited for use on construction and agricultural machines are made of steel with a rim ring and a with a hub plate. A typical design is that the rim ring is rolled in the wanted diameter and made with rim edges and other geometric shapes such that a tyre can be fitted thereon. The hub plate typically consists of a steel plate, either plane or shaped with one or more depressions. These depressions have partly the purpose of stiffening the hub plate and partly for bevelling the contact surfaces which are secured to a hub on a vehicle and to the inner side of the rim ring. The hub plate can often be mounted on the rim ring at various positions such that the position of the rim ring relative to the hub on the vehicle can be adjusted. This may be necessary if a tractor and an implement are to be driven between rows of crops on a field. By moving the hub plate between the various positions and by possibly turning the hub plate around, a plurality of different possibilities for changed wheel gauges are attained.

Another known adjusting possibility on such rims is the central part of the hub plate itself which advantageously can be replaceable as not all vehicle hubs are made with the same dimensions. Frequently there is a recess on the hub on which the rim bears via a central hole in the hub plate, and furthermore there are a number of bolt holes in the hub plate which are to fit bolt holes or bolts on the hub. By making the hub plate in two parts, the central part of the hub plate—the central hub plate—can be selected depending on which hub the wheel rim is to the mounted. For example, the central hub plate may have a central hole with a diameter of 390 mm, and ten holes with a diameter of 16 mm are disposed on a pitch circle with a diameter of 430 mm, corresponding to the actual hub. At the outer periphery on the central hub plate there may be provided a standardised hole pattern which fits all current hub plates. Thus it becomes possible to use the same rim on a plurality of different hubs just by replacing the central hub plate to one having proper dimensions. Central hub plates of the said type is often made of steel plate and may be plane as well as pressed with a depth.

However, many rims are made with a welded hub plate and with a central hub plate that can be turned around and which furthermore can be moved from one side to another of the welded hub plate in order thereby to adjust the wheel gauge of the actual vehicle. Alternatively, the central hub plate can be replaced by another one where the pressing depth is different. Respective hub plates are joined to each other by means of bolts with washers and nuts.

When a tractor or a contractor's machine is to be provided with wheel rims which either are or can be adapted to the desired wheel gauges, it is very often a request from the customer that the rims are to be delivered with a certain colour. In order to meet this demand, it is often required that the rims and hub plate initially are to be painted. If a dealer of wheel rims wants to shorten the delivery time, he is actually required to have a disproportionately large stock of prefabricated rims of different dimensions and with different types of hub plates and not the least a plurality of different colours. By having this large stock, where part of or all rims may be painted in the most current colours, a reasonably short delivery time can be achieved. However, typically it appears that this large stock is not attractive for the supplier as orders for making wheel rims and/or hub plates that are not in stock frequently occur anyway.

Another drawback of the prior art solutions is that the hub plates are made with a central hole wherein along the periphery of the hole is located a plurality of holes corresponding to similar holes in the central hub plate made with a diameter about 60 to 100 mm greater than the central hole in the hub plate. In other words, there is a relatively large waste of material as the material in the central hole cannot be used but has to be discarded.

From U.S. Pat. No. 4,279,446 is known a solution to an adjustable wheel rim where between the rim ring and the hub there is arranged a multi-part hub plate which in principle consists of a plurality of uniform parts arranged releasably in continuation of each other between hub and rim ring on elevations adapted for the purpose on the rim ring itself. Thus it is so that a multi-part hub plate can be moved between various positions on a rim ring. In no way it is here envisaged how the design of the individual parts should be in relation to each other in order to achieve a minimal consumption of material and simultaneously achieve a minimal number of work processes. Furthermore, it is a rather cumbersome solution as it is not readily possible to change the pressing depth of a wheel rim into another, and not at all into a third value.

From US 2008/0054714 A1 it is known with another solution wherein a hub plate can be mounted at a first or a second side of a fitting on a rim ring. Also, the hub plate can be reversed, and hereby four different pressing depths are enabled on such a wheel. Not in this solution either there is thought about minimising material consumption or to achieve a minimum number of work processes, neither during production nor during use.

SUMMARY OF THE INVENTION

It is the object of this invention to indicate a solution to the above mentioned problems wherein a wheel rim can be adapted to different wheel gauges by moving one or more hub plates in relation to each other, where the stock as well as delivery time can be minimised in relation to the prior art types of wheel rims, and where the production of the wheel rims is effected with reduced waste of material and by optimised processes.

As mentioned in the introduction, the invention also concerns a wheel rim of the type suited for use on an agricultural or construction vehicle.

The new feature of the wheel rim according to the invention is that the central hub plate at the outer periphery includes a number of tabs extending away from the centre of the central hub plate and preferably in radial direction, where the second hub plate at its inner periphery also includes a number of tabs extending towards the centre of the hub plate and preferably in radial direction, where the tabs have a geometric shape such that the tabs fit between each other, where the tabs include holes arranged at the same pitch circle diameter and at right angles to the contact surfaces of the tabs and thus substantially in axial direction as seen in relation to the centre of respective hub plates.

In connection with the making of the hub plate, the second hub plate and the central hub plate can be produced from a single piece of suitable material, preferably steel plate, as the mentioned tabs extend over each other when two parts are separated and turned such that the tabs come to lie upon each other. The two hub plate parts are then joined by bolts in the holes formed in the mentioned tabs.

The prior art solutions provide that the two hub plate parts are made with a circular internal cutout and with a circular external cutout, respectively, wherein the diameters overlap each other such that it is possible to dispose a number of bolts in this overlap. By the invention, waste of material is minimised in comparison as it is only the material removed in the cut itself that constitutes a loss. The new feature by a method for making a wheel rim according to the invention is that the central hub plate and the second hub plate as mentioned are formed of the same work piece as the work piece is machined by a tool suited for the purpose such that the central hub plate is formed with a periphery with a number of projecting tabs, the tabs being formed of the material located between corresponding tabs on the inner periphery of the second hub plate, and that the tabs include holes for joining the central hub plate and the second hub plate. As mentioned, bolts and nuts are used for this joining.

The work pieces may advantageously be cut out by a laser cutter or by water cutting, or other suitable method. In that the two parts are formed of the same item without waste, a cheaper product to the benefit of producer, buyer and not the least to the benefit of the environment is achieved. At the same time, there is the great advantage that a work operation is saved as both the central hub plate and the second hub plate are made in one and the same work operation. This advantage obviously also has a significant impact on price and environment.

The central hub plate can be joined with the second hub plate at one side or at the other side of the latter.

In a preferred embodiment of a wheel rim according to the invention, the central hub plate can be designed with at least one bevel shoulder between the contact face on the tabs and the holes for securing to a hub. Hereby is achieved yet an adjusting possibility for the wheel gauge as the bevel shoulder can be turned towards the hub and away from the hub while at the same time the central hub plate can be mounted at both sides of the second hub plate. A further advantage of making the central hub plate with one or more bevel shoulders is that increased stability/rigidity and strength in the plate itself are achieved. The stability/rigidity is increased as the moment of inertia is increased and the strength is increased, partly due to the higher moment of inertia and partly due to deformation hardening in the material of which the central hub plate is made.

Yet an advantage of using a central hub plate is that if made with a diameter which is as small as possible, a small part of a wheel rim, namely the central hub plate, can be readily replaced with a corresponding central hub plate wherein the hole pattern for mounting on a hub is different. The wheel rim may thus be adapted to various hub types without difficulty only by changing between different central hub plates.

In yet a preferred variant of a wheel rim according to the invention, the second hub plate can advantageously be designed with at least one bevel shoulder between the contact face on the tabs at the inner periphery and the holes at the outer periphery for direct or indirect joining at the rim ring, entailing the same advantages as mentioned above and many different adjusting options as well.

A wheel rim according to the invention may advantageously be designed so that rim ring as well as hub plates are made of steel. Hereby is achieved a strong and simple solution which has had a satisfactory effect for many years.

In a preferred variant of the invention, the central hub plate may be surface treated by electroplating. Such a surface treatment can be provided with different colours wherein these colours can be used as identification for the type, or the colour can just be matched to the colour of other parts of the wheel rim according to wish. By such a solution it is possible to apply a personal touch to one's wheel rim or vehicle in line with the way e.g. cars and lorries are applied a personal touch.

In an embodiment of a wheel rim according to the invention, the hub plate further includes an outer hub plate, where the outer hub plate at its outer periphery is fixed to the rim ring or includes means for fixing to the rim ring, and at its inner periphery includes a number of tabs extending towards the centre of the hub plate, where the tabs correspond in number and position to corresponding tabs on outer periphery of the second hub plate, where the tabs have a geometric shape such that the tabs fit between each other, the tabs including holes arranged at the same pitch circle diameter and at right angles to the tabs and thus preferably in axial direction relative to the rotary axis of the wheel rim. By such a wheel rim is achieved yet a possibility of adjusting the wheel gauge of a vehicle. Precisely as mentioned above, a hub plate can be made as one piece which is cut with a suitable tool and subsequently includes e.g. an outer, a second and a central hub plate. These parts are made of one work piece, and due to the overlapping tabs these pieces can be joined with e.g. bolts and nut, alternatively by welding or other suitable joining method. By such a solution are achieved a lot of advantages and adjusting options.

A wheel rim as mentioned above can advantageously be made in that an additional outer hub plate is formed of the same work piece of which the central hub plate and the second hub plate are formed, that the second hub plate is formed with an outer periphery with a number of projecting tabs, that these tabs are formed of the material located between corresponding tabs on the outer periphery of the outer hub plate, the tabs including holes for joining the two hub plate parts. If the tabs have sufficient strength in order to transmit the required forces during use of the wheel rim, the tabs may readily be designed such that they are smaller in size than the distance between two tabs, which however will require more cutting work in connection with cutting respective hub plate parts. However, on the face of it nothing speaks in favour of this as the amount of material cut off will not be very large and thereby will not have any appreciable impact on the economy as a whole.

A wheel rim according to the invention can advantageously be made in that the work piece of which the at least two-part hub plate is formed is shaped, e.g. by pressing or forging, whereby the work piece has achieved an embossing with a concave geometry, e.g. with a concave as well as a convex geometry. Hereby is achieved a solution with advantages as described earlier where rigidity, moment of inertia as well as adjusting options are improved.

However, it is possible to make a wheel rim according to the invention wherein the work piece of which the at least two-part hub plate is formed is plane. Hereby is achieved a cheaper wheel rim as the above mentioned embossing/pressing/forging is obviously connected with costs. However, it is still possible to dispose respective parts in various ways in relation to each other in order thereby to achieve various wheel gauges and also the possibility of adapting the wheel rim with a certain hole pattern for securing on a hub of a vehicle.

A further option is to adapt a wheel rim according to the invention includes using spacer blocks or preferably a spacer ring between e.g. a central hub plate and a second hub plate. The two hub plates may hereby be mutually displaced in axial direction. This can be solved with a simple intermediate ring or with a number of blocks corresponding to the number of tabs in the joint in question.

Another and more interesting solution, however, comprises a spacer ring which is in two parts or alternatively consists of several parts wherein each part is cut from a plane material and bent by simple sheet bending into a finished spacer ring. In its basic form, such a spacer ring is constituted by a number of plane plate parts where each plate part is cut out by a suitable cutting tool, and where each plate part after ended cutting includes a central longitudinal part, and at each side of the central longitudinal part there is arranged a side portion including a number of tabs, each tab typically including a bolt hole in the direction of material thickness for joining with a bolt hole in a tab on a hub plate part.

After cutting the work piece, the tabs are bent relative to the longitudinal central part into an approximately right angle whereby a U-shaped profile is formed. Besides the fact that the side portions include a number of tabs, these are furthermore shaped with a number of edge faces. When the work piece is bent into U-shape, a further number of bends are made in direction transversely to the longitudinal central part as for each set of tabs a bend is performed. This bend is limited to the previously mentioned edge faces as the bend is finished when an edge face at one tab is in contact with a second edge face at a second tab, which by the way is the case for both side portions along the central part. A spacer ring as mentioned here will thus appear as an edged item with an edge for each set of tabs, with U-shaped cross-section and with the side portions as flanges facing the rotary axis of a wheel rim.

If a spacer ring is made for use between a central hub plate and a second hub plate wherein e.g. there are ten tabs in the joint in question, a complete spacer ring according to the invention, typically consisting of two or maybe more uniform subelements, will include ten tabs at each side portion, where each hole is arranged such that it fits with the pitch circle diameter for the two hub plate parts.

Thus there is achieved a spacer ring with a given thickness adapted for use between two hub plate parts as indicated above.

In a preferred embodiment of these spacer rings, a spacer ring consists of two sub-rings which are identical and which can be made and stored without appreciable challenges as only cutting and bending operations are needed and no bending into a closed item is performed. However, it can be done, and such a solution with a spacer ring consisting of just one part is certainly usable, but making it in two parts is immediately the most attractive way of doing it with regard to the machine handling in connection with the bending operations.

A spacer ring as described above can immediately be cut from a plane piece of steel with adequate thickness and of suitable quality. In a preferred variant, the above mentioned tabs and the spacing between them are made such that they fit in between each other whereby a very limited waste of material is achieved—an almost insignificant amount of cuttings which by the way can be recycled.

A possible solution with a spacer ring as described here will be discussed in detail in the subsequent description of the drawing.

When using a spacer ring as indicated above, which also can be regarded as a rim part with e.g. ten edges/faces or more or less, the wheel will appear with a characteristic rim part with an axial dimension of e.g. 50 to 250 mm, or even more. This edged rim part on e.g. a front wheel or rear wheel of a tractor may advantageously be used in connection with coupling with a twin wheel.

In principle, a twin wheel is an extra wheel mounted upon the original wheel of a vehicle, and the two wheels are secured to each other in such a way that a torque can be transmitted between them without one wheel rotating more than the other when e.g. a tractor is working on a field. In other words, the connection between a twin wheel and an original wheel is relatively stiff. For overcoming the challenge of securing previously very traditional solutions have been applied with a spacer ring which creates/keeps the necessary spacing between the rim rings of the two wheels and with clamping rods that are fixed to respective rim rings or hub plates, and which are tightened via clamping devices arranged for the purpose. Examples of such joints and methods for the purpose are known i.a. from EP 0 084 979 A2, EP 0572 876 A1, FR 2 505 742 A1 and from U.S. Pat. No. 3,836,202.

With an edged rim part or spacer ring as indicated above it is actually possible to achieve a torsionally rigid and relatively simple joint between two wheels. The edged rim part is mounted on one of the two wheels whereas the other of the two wheels can include/be fitted with a similarly edged and corresponding part which is only with open access, as it is only a kind of sleeve or a sleeve ring adapted in dimensions and tolerances to be put in over the edged rim part. The fact that the inner rim part as well as the outer sleeve are edged ensure a torsionally rigid relation between the two parts.

Figuratively speaking, the rim part can be described as a subelement in a telescopic assembly whereas the sleeve on the other wheel is another subelement in a telescopic assembly, or alternatively the rim part can be compared with a nut and the sleeve ring with a corresponding box wrench.

The fact that the two parts are torsionally rigidly interconnected when the edged sleeve is displaced in over the similarly edged rim part is an obvious advantage compared with prior art where a regular pull—even a skew pull—in a number of pull rods ensures a sufficiently torsionally rigid connection. By this solution, torsion is transmitted from the original wheel to the twin wheel in that the two edged parts are edged and therefore cannot perform any angular movement in relation to each other. There will/can only be a very small angular movement due to the production tolerances which, however, can be eliminated by firm clamping together of the two edged parts.

In principle, by the interacting edged parts the spacing between an original wheel and a twin wheel can be adjusted according to need and after having positioned the two wheels relative to each other so that fixing of the edged parts to each other can be performed. Such a fixation can be performed by loose bolts and nuts and by other kinds of mechanical joining. An example of this can be fixing means arranged either on the sleeve or on the rim part and which, when the two parts are at desired positions, can be brought to engage with the respective parts. For example, there may be arranged a plurality of cutouts on one of the two parts and fixing means associated therewith on the other of the two parts such that when the desired position of the twin wheel relative to the original wheel is achieved, these fixing means are actuated and lock the two wheels in relation to each other in the preferred position.

Such an assembly can e.g. be with spring-biased fixing means which are released for locking engagement with the other part when the latter is in an intended position—a kind of automatic or semi-automatic snap-action coupling where one or more lock pawls are released and brought to engage with cutouts adapted for the purpose or similar on the other part. Thus joining means and/or cutouts constituting two or more steps may be arranged, each step constituting a given spacing between the two wheels.

By a solution for mounting twin wheels on original wheels as indicated above it is thus possible to choose a specific spacing between the two wheels and at the same time have an optimally torsionally rigid joint. Hereby it becomes possible to avoid the hitherto known spacer ring or structure between an original wheel and a twin wheel. Exactly this spacer ring has hitherto been a permanent component part of twin wheel applications, and the other joining means—clamping rods etc—have always been adapted to these spacer rings.

By the solution indicated here it is, as mentioned, possible to choose between more spacings between the wheels and at the same time avoid the traditional spacer ring and the traditional clamping rods and clamping devices as well. All are parts that are more or less adapted to a spacer ring with a specific size.

By the new solution indicated here, a more flexible solution is achieved wherein a twin wheel is easily and simply arranged opposite an original wheel and displaced in axial direction and simply and easily is fixed at the desired distance to the original wheel.

In other words, this is a markedly different way of mounting a twin wheel where the technical features as well as the principle as a whole breaks with the very traditional methods that have been applied since the nineteen sixties. When using equipment and a method as described above a markedly simpler mounting is achieved as well as a markedly lesser risk of a twin wheel not being sufficiently rigidly connected to the original wheel, a very important fact for safety reasons as a loose wheel can cause considerable material damage and not the least injury to a person if a twin wheel falls off a tractor when driving, due to insufficient securing.

The invention is described in the following with reference to the drawing, wherein:

DETAILED DESCRIPTION OF THE INVENTION

Figure 1:
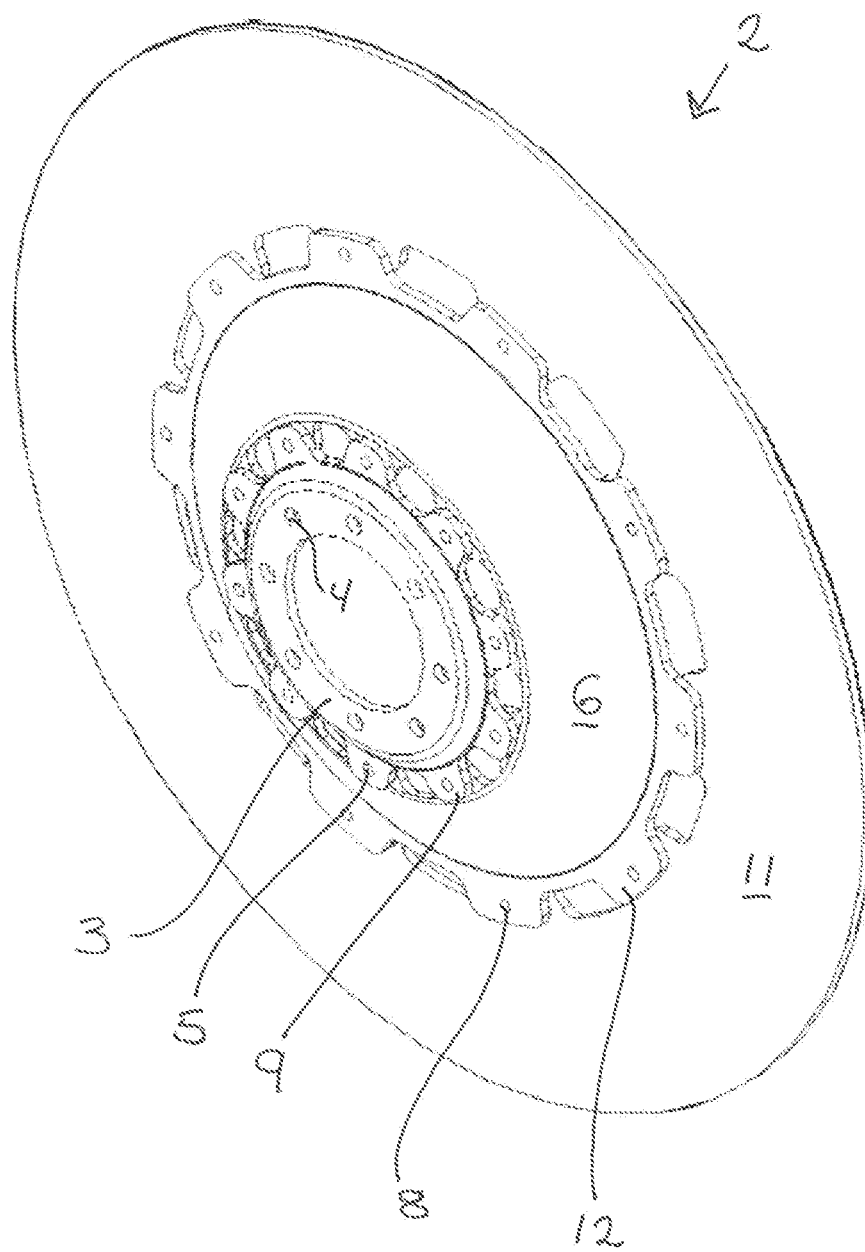
FIG. 1 shows a divided hub plate with a central hub plate, a second hub plate and an outer hub plate.

In the explanation of the Figures, identical or corresponding elements will be provided with the same designations in different Figures. Therefore, an explanation of all details will not necessarily be given in connection with each single Figure/embodiment. means/holes for joining spacer ring and sleeve ring In FIG. 1 is seen a divided hub plate 2 with a central hub plate 3, a second hub plate 6 and an outer hub plate 11. These hub plates 3, 6, 11 are mounted upon each other as holes 5 and 8 are arranged at the tabs 9 and 12 and in which not shown bolts can be disposed.

As it appears from the Figure and as it will appear from several succeeding Figures, respective hub plates 3, 6, 11 along the inner as well as the outer peripheries are provided with tabs 9, 10, 12, 13, of which some are not clearly seen in this Figure. By making the hub plates 3, 6, 11 with these tabs 9, 10, 12, 13, these parts can be formed of one work piece, and after having pressed or otherwise shaped the piece, the parts are cut to shape, separated and mutually rotated "one step", whereby the tabs 9, 10, 12, 13 are brought into mutual contact in pairs. The final joining will typically occur with the mentioned not shown bolts in the holes 5, 7, 8, 14.

Figure 2:
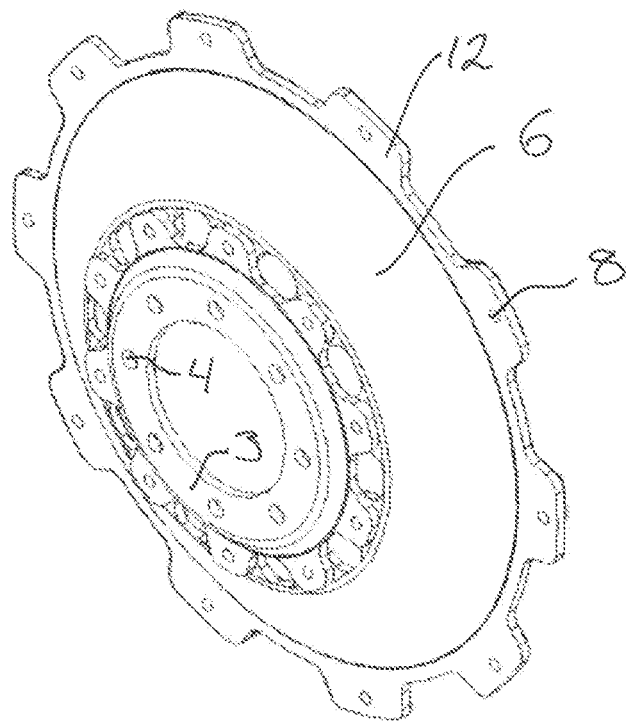
FIG. 2 shows a central hub plate and a second hub plate.

FIG. 2 only shows a central hub plate 3 and a second hub plate 6, wherein the tabs 12 on the outer periphery of the second hub plate 6 are seen a bit more clearly than in FIG. 1.

Figure 3:
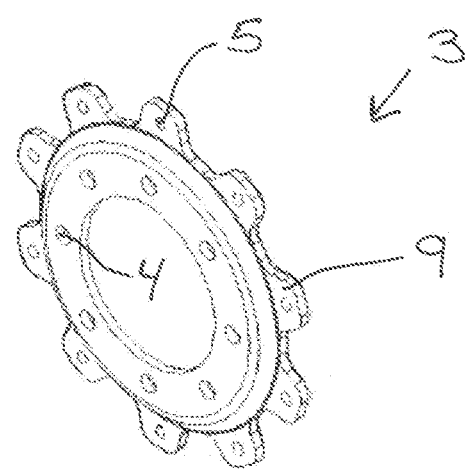
FIG. 3 shows a central hub plate.

In FIG. 3 is shown a central hub plate 3 with tabs 9 at the outer periphery in which holes 5 are provided for joining with a second hub plate 6. At the centre of the central hub plate 3 there is a boring for contact with a not shown hub of a vehicle, and at this boring is provided a number of holes 4 through which the central hub plate 3 can be mounted with bolts on the said hub.

Figure 4:
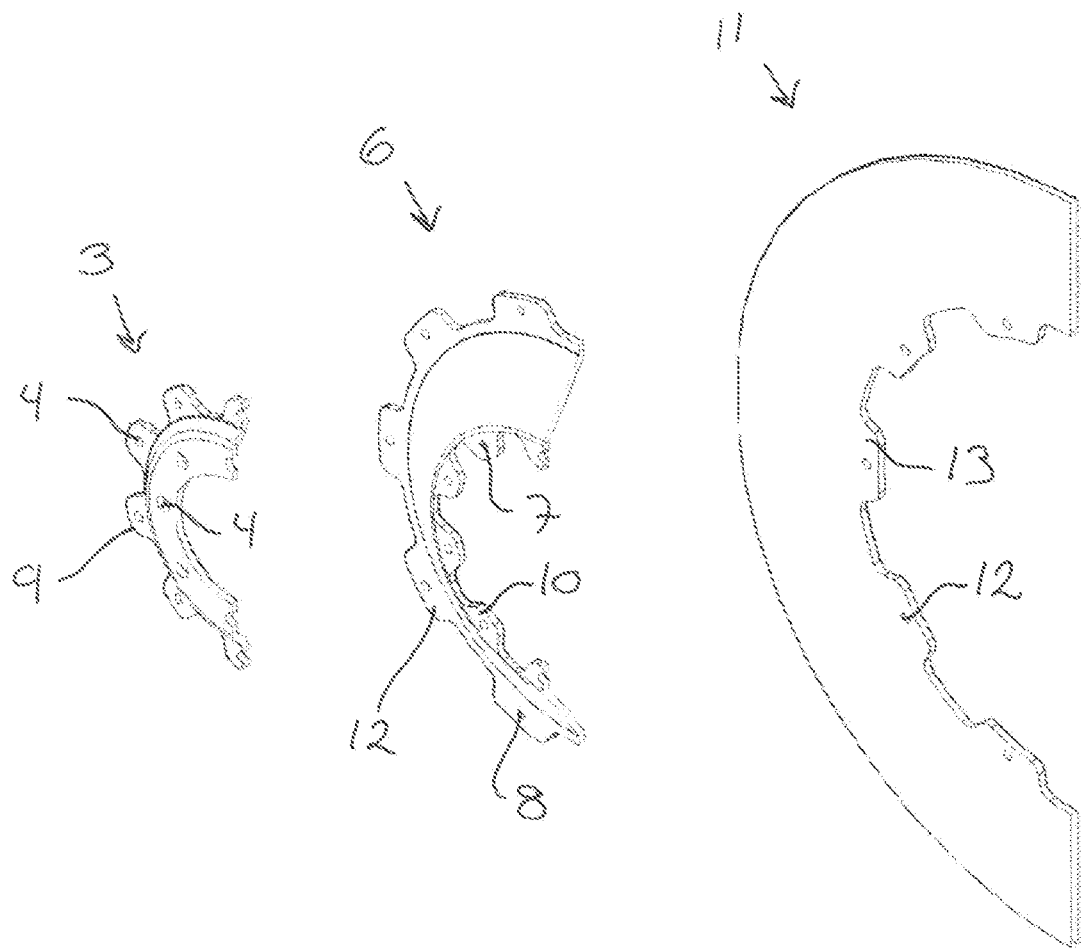
FIG. 4 shows as FIG. 1 a central hub plate, a second hub plate and an outer hub plate but here divided and with visible cross-section.

FIG. 4 shows as FIG. 1 a central hub plate 3, a second hub plate 6 and an outer hub plate 11 but here separated from each other and with visible cross-section. In this Figure, the tabs 10, 13 facing inwards as well as the tabs 9, 12 facing outwards are seen on the central hub plate 3, the second hub plate 6 and the outer hub plate 11, respectively. These tabs 9, 10, 12, 13 are provided with holes 5, 7, 8, 14 for joining with a hub plate part 3, 6, 11. As it appears on the Figure, this hub plate 2 is divided into three parts, and these parts 3, 6, 11 can be joined in many different ways. Respective parts 3, 6, 11 may be disposed at both sides of one another and the second hub plate 6 and the central hub plate 3 can be turned separately or both at once. By combining these possible joint there are achieved a plurality of different options for adapting a wheel rim to a desired wheel gauge.

It appears clearly from FIG. 4 that the second hub plate 6 fits perfectly into the hole at the centre of the outer hub plate 11 as the tabs on the outer hub plate 11 fit into the cutouts located between the two tabs on the second hub plate 6. Similarly, the central hub plate 3 fits into the central hole in the second hub plate 6. This is thus an optimal utilisation of material, instead of making the respective parts circular and with overlapping sizes, entailing a markedly greater waste as the material cut from a circular hub plate is not large enough for a second circular hub plate.

Figure 5:
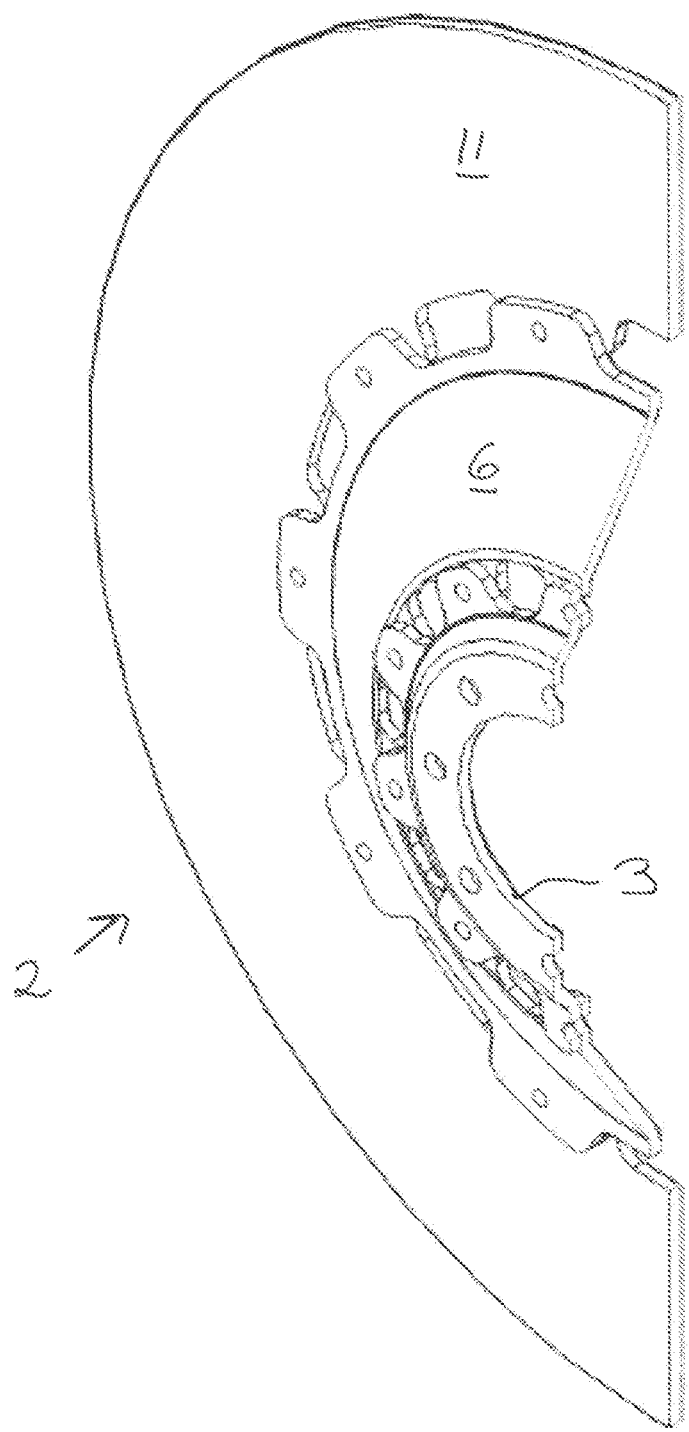
FIG. 5 shows as FIG. 1 a central hub plate, a second hub plate and an outer hub plate with visible cross-section.

FIG. 5 shows as FIG. 1 a central hub plate 3, a second hub plate 6 and an outer hub plate 11 with visible cross-section. In the shown embodiment, the hub plate 2 is designed such that the greatest possible distance is provided from the central hub plate 3 to the outer hub plate 11. By mounting the central hub plate 3 at the other side of the second hub plate 6, the hub plate 2 is narrowed by a dimension corresponding to the thickness of a plate. Another possibility is to turn the central hub plate 3 around, entailing that the hub plate becomes narrower by the same length with which the central hub plate 3 is offset. In this position, the central hub plate 3 can obviously also be disposed at one or the other side of the second hub plate 6.

In the same way it is possible to move and turn the second hub plate 6 in relation to the outer hub plate 11. It is even possible to perform additional adjustments by using not shown spacer members between respective tabs 9, 10, 12, 13.

Figure 6:
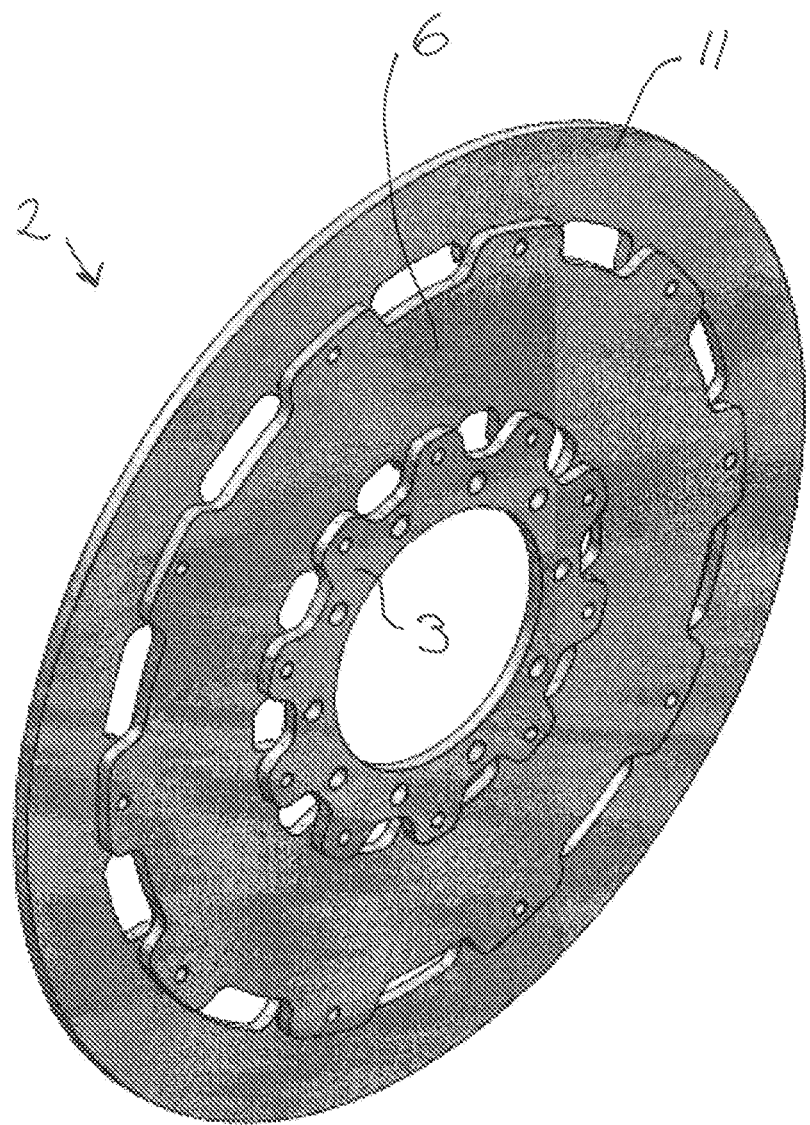
FIG. 6 shows as FIG. 1 a central hub plate, a second hub plate and an outer hub plate made in plane material.

FIG. 6 shows as FIG. 1 a central hub plate 3, a second hub plate 6 and an outer hub plate 11 which is here made of plane material. This solution is cheap as no deformation of the hub plate 2 is to be performed prior to the cutting of respective hub plate parts. However, there are not so many adjusting options as obviously there is no effect of turning the hub plate parts around in relation to each other. Only the thickness of the respective parts 3, 6, 11 can be operated with.

Figure 7:
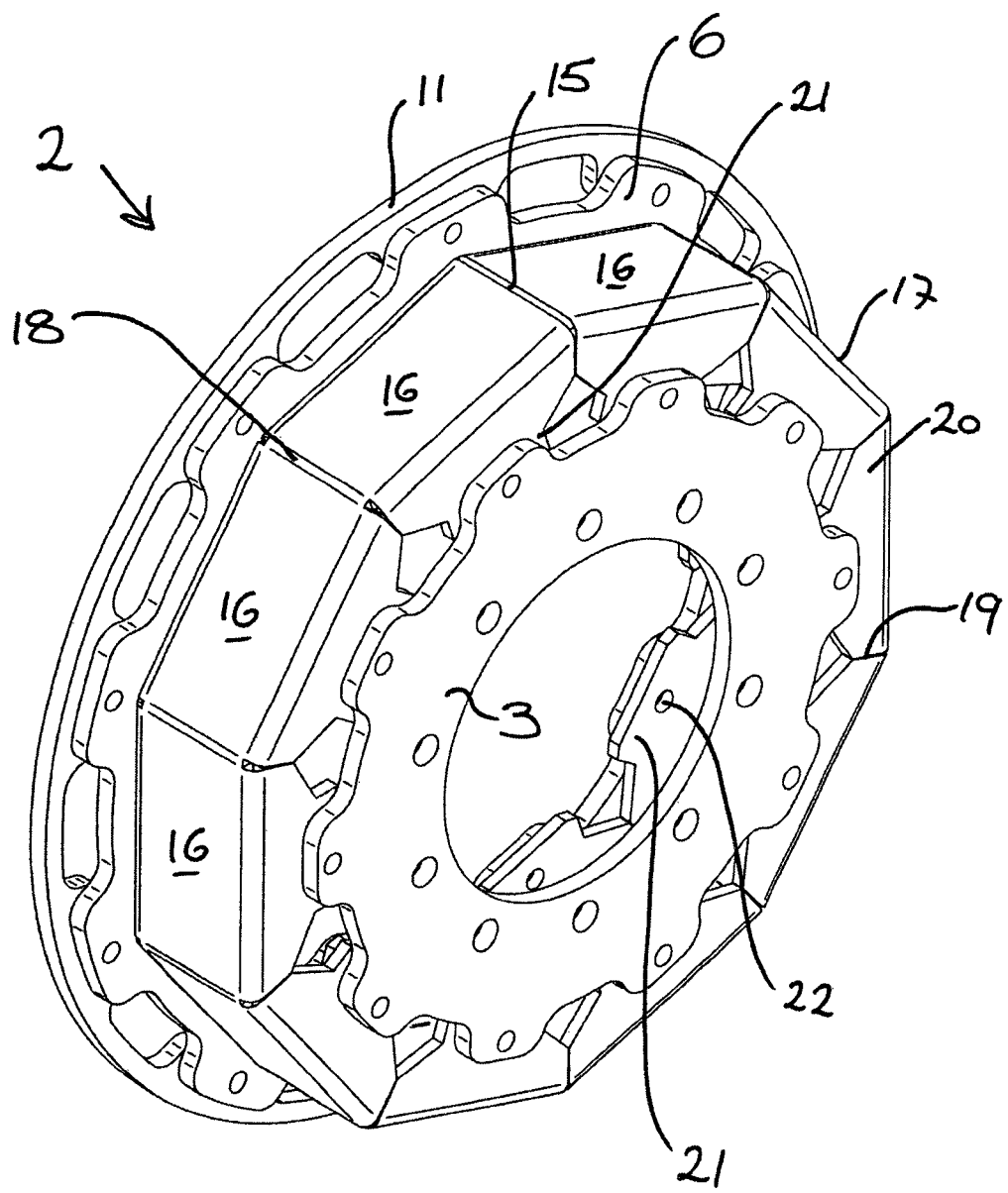
FIG. 7 shows a central hub plate, a spacer ring, a second hub plate and an outer hub plate.

FIG. 7 shows yet a solution of a divided hub plate 2 including a central hub plate 3, a spacer ring 15, a second hub plate 6 and an outer hub plate 11. The difference between what appears in this Figure and what appears in FIG. 1 and FIG. 6 is in principle that a spacer ring 15 is mounted. This spacer ring 15 provides that the wheel gauge on a vehicle can be varied substantially more in a simple way as respective rim parts can be disposed even more mutually offset compared with the above described options.

The spacer ring 15 has ten edges 16 in the shown variant and is made of a plate material by cutting and then by bending at longitudinal bending lines 17 longitudinally of the central longitudinal part 23 and subsequently at the transverse bending line 18, until the edge faces 19 on the side portions 20 are in contact with each other. The side portions 20 each includes a number of tabs 21 in which are arranged means/holes 22 for joining with e.g. a central hub plate 3 and with a second hub plate 6.

In order to make such a spacer ring/rim part 15 in a rational way it may advantageously be made in two parts.

Figure 8:
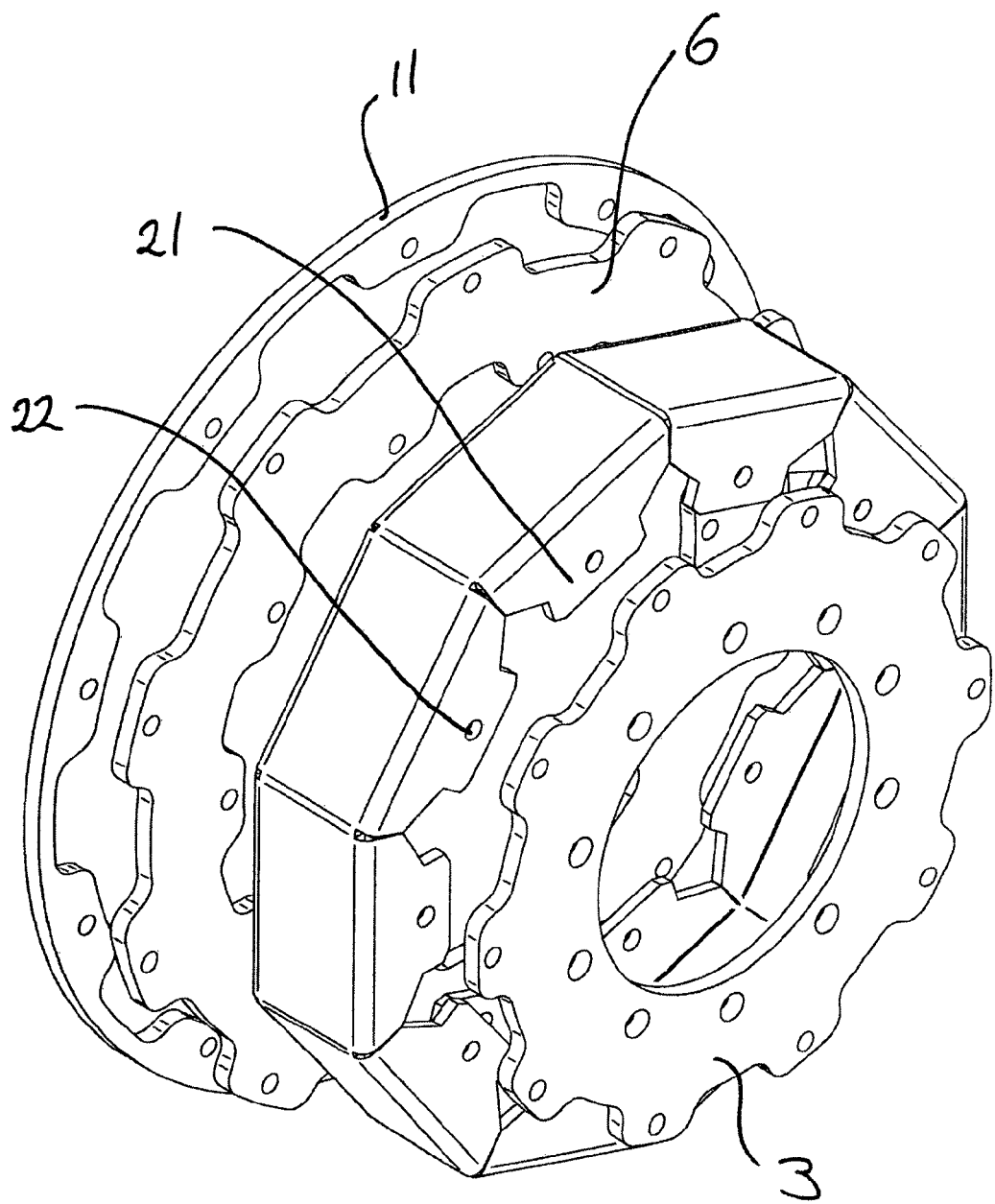
FIG. 8 shows as FIG. 7 a central hub plate, a spacer ring, a second hub plate and an outer hub plate but here separated from each other.
Figure 9:
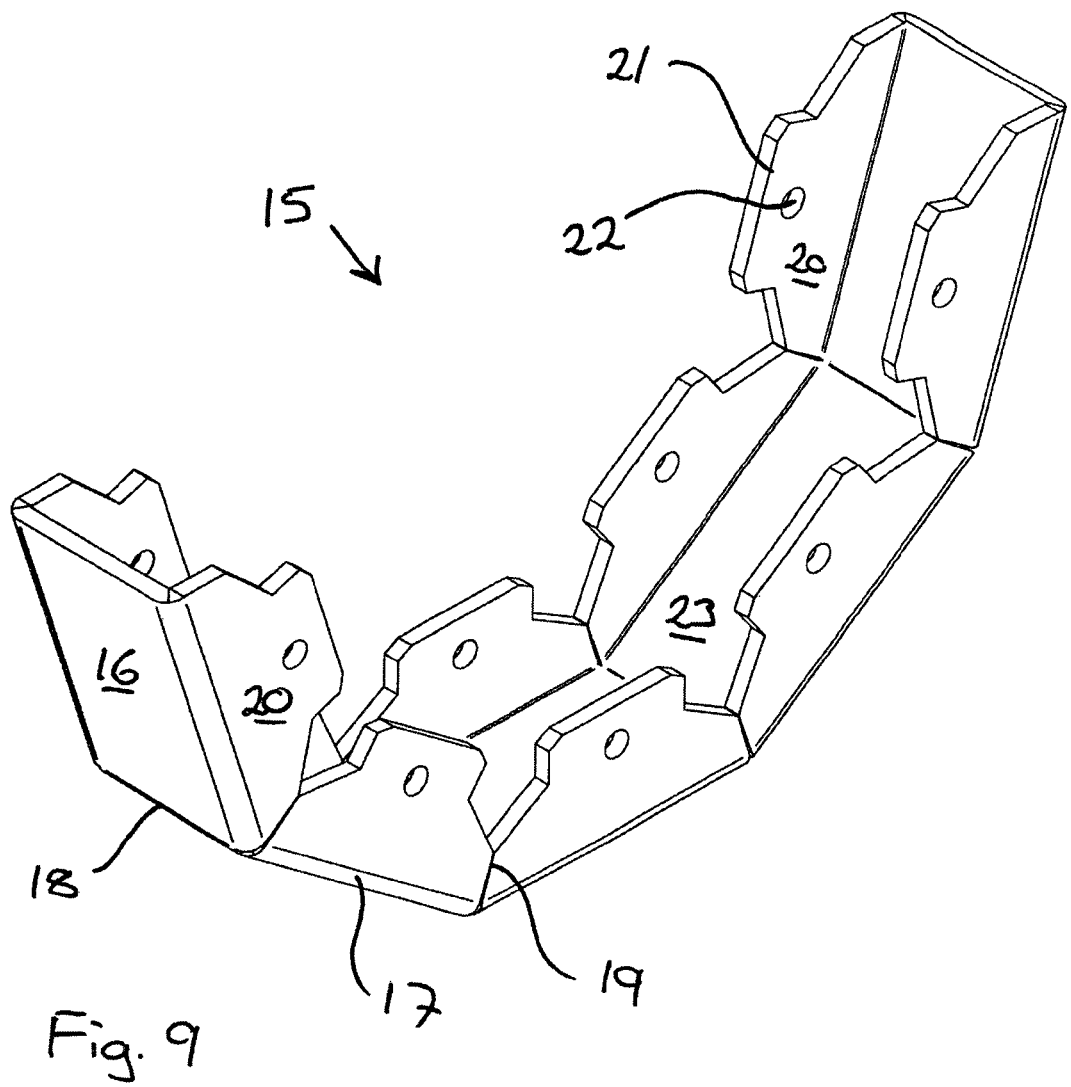
FIG. 9 shows one part of a two-part spacer ring.

FIG. 8 shows as FIG. 7 a central hub plate 3, a spacer ring 15, a second hub plate 6 and an outer hub plate 11 but here separated from each other;

FIG. 9 shows one part of a two-part spacer ring 15 which together with a corresponding part form an assembled spacer ring 15.

Figure 10:
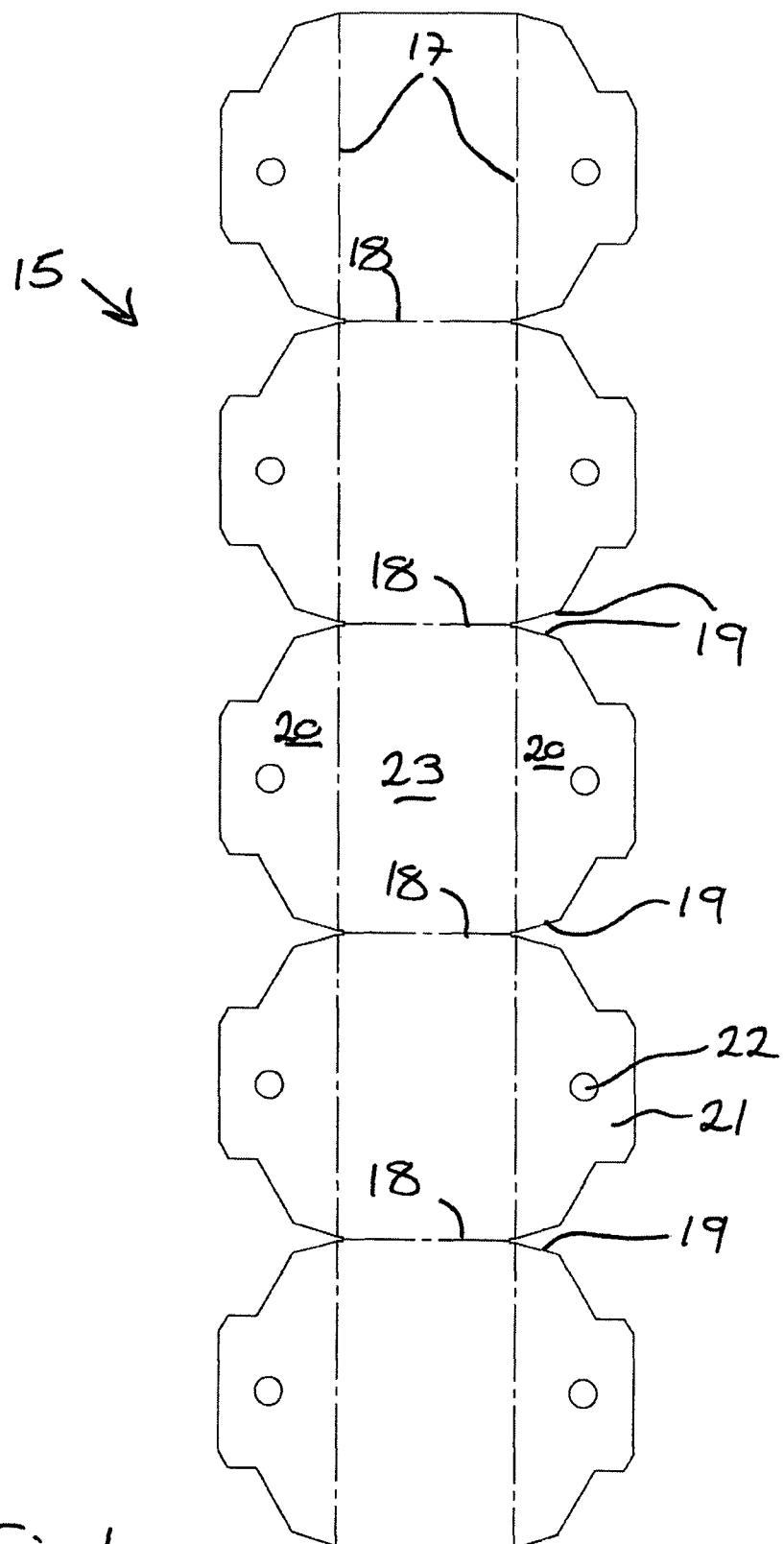
FIG. 10 shows as in FIG. 9 one part of a two-part spacer ring but here in unfolded condition.

FIG. 10 shows as in FIG. 9 one part of a two-part spacer ring 15, but here in unfolded condition where the bending lines 17, 18 are shown and where the longitudinal central part 23 is clearly seen with associated side portions 20. Such an unfolded, or rather unbent part, for a spacer ring can be cut with current tools from a plate material, such as steel, and subsequently bent along the longitudinal bending lines 18 and then along the transverse bending lines 18, until the edge faces 19 are in contact as indicated. This is envisaged in the shaping for several reasons. One being that the bending process is made more simple and another because a more rigid spacer ring 15 is achieved as well when mechanical contact occurs. In some cases where even more strength and rigidity is desired in the spacer ring 15, this may possibly be welded at the said edge faces 19. Moreover, the unfolded spacer ring is designed such that the tabs 21 fit in between two other tabs 21 why several of the plate pieces for spacer rings can be cut from the same plate with a minimum of waste of material.

Figure 11:
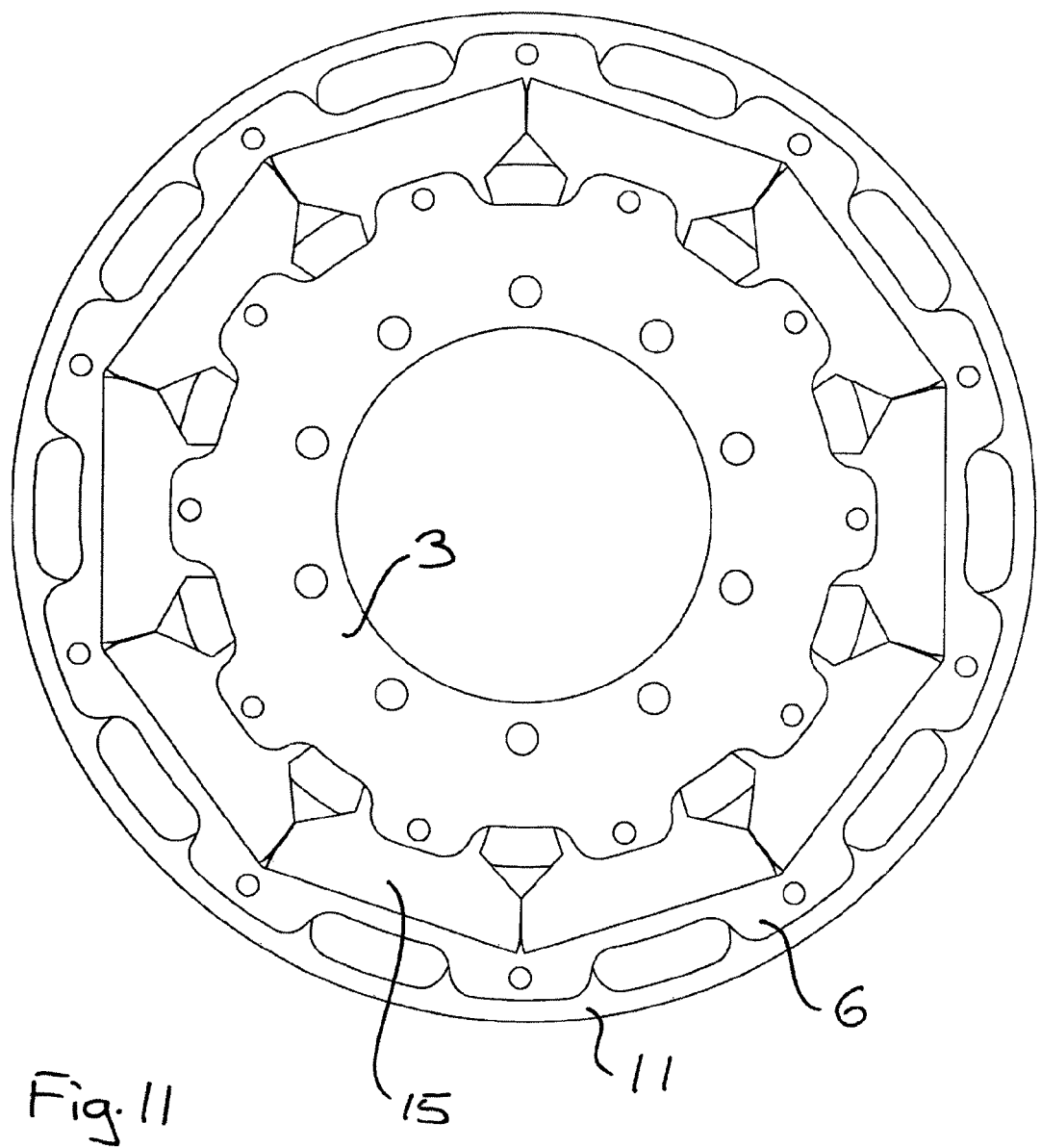
FIG. 11 shows a central hub plate, a spacer ring, a second hub plate and an outer hub plate, as seen from the front.

FIG. 11 shows a central hub plate 3, a spacer ring 15, a second hub plate 6 and an outer hub plate 11, as seen from the front. Here it is seen that the spacer ring/rim part 15 is two-part as the joint between the two parts is shown at top and bottom corresponding to 12 and 6 o'clock. Furthermore, the edges 16 are clearly sensed in this Figure as the entire spacer ring 15 resembles a large decagonal nut.

Figure 12:
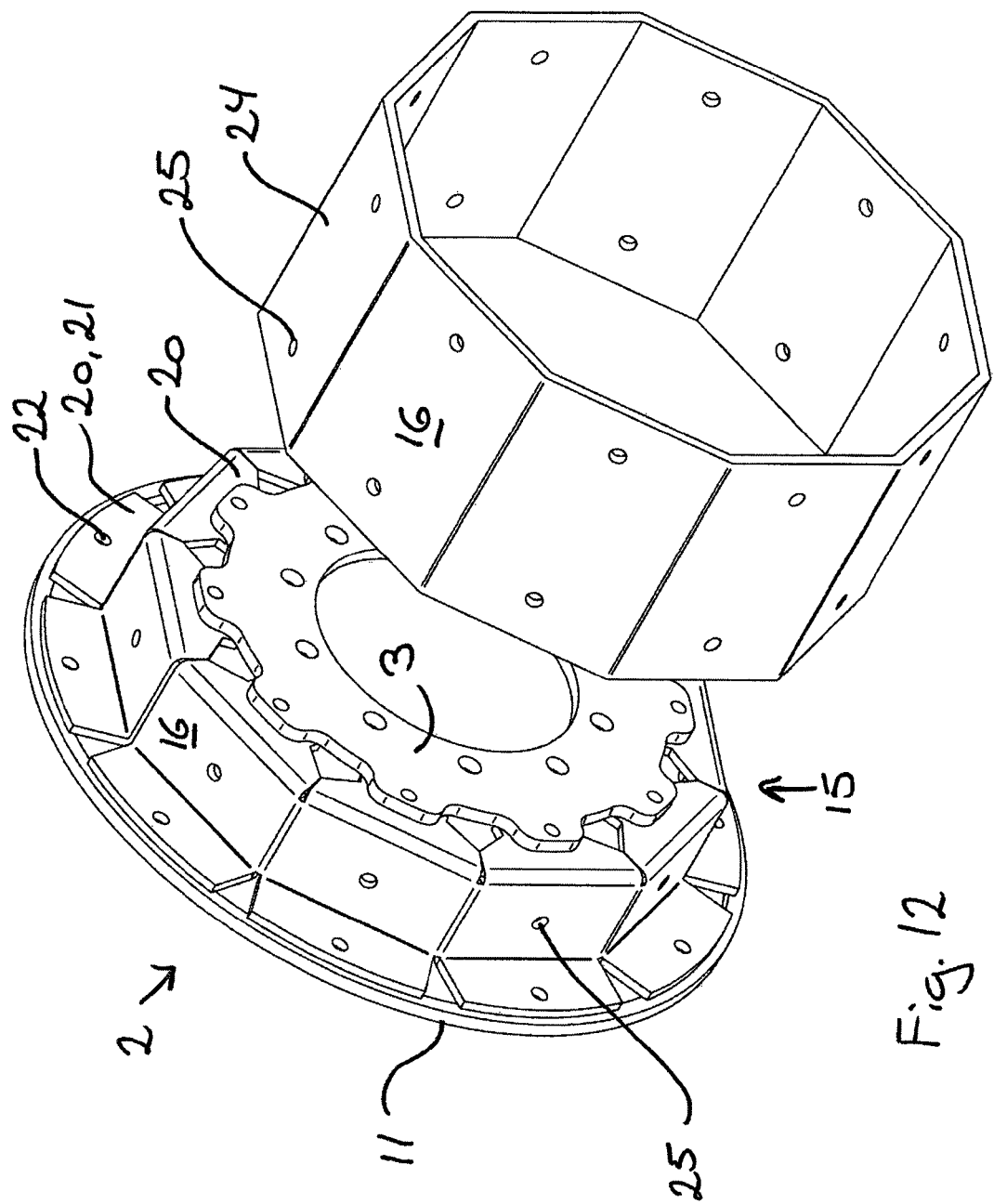
FIG. 12 shows a divided hub plate with an edged spacer ring/rim part and a sleeve ring.

Finally, FIG. 12 shows a divided hub plate 2 with an edged spacer ring/rim part 15 and a sleeve ring 24. The sleeve ring 24 is arranged with not shown means for mounting on a rim ring to a twin wheel, either by using fastening means or by welding or in another suitable way.

The sleeve ring 24 is here adapted with a corresponding number of edges 16 as on the rim part 15 but with an internal dimension allowing that the sleeve ring 24 can be displaced in over the rim part 15 when the said edges 16 are parallel. In the shown example, there are cutouts/holes 25 in the edges 16 on the rim part as well as on the sleeve ring 24. These cutouts/holes 5 can be filled by bolts with nuts whereby a secure and simple joining of rim part 15 (original wheel) and sleeve ring 24 (twin wheel) can be achieved. However, it is apparent that a rim part 15 as indicated here can be arranged on a twin wheel whereas a sleeve ring 24 can be arranged on an original wheel.

What is claimed is:

1. A wheel rim of the type suitable for use on an agricultural or construction vehicle, wherein the rim includes a rim ring for mounting a tire and further including an at least two-part hub plate extending inside the rim ring, where the at least two-part hub plate includes a central hub plate including a number of holes and a contact surface for mechanical and detachable securing to a hub on a vehicle, wherein the central hub plate includes holes on a contact surface at the outer periphery for joining with a second hub plate with an inner periphery and an outer periphery, wherein the second hub plate at the inner periphery includes a contact surface with corresponding holes for joining with the central hub plate, where the second hub plate at the outer periphery includes holes for direct or indirect joining with the rim ring, wherein the central hub plate at the outer periphery includes a number of tabs extending away from the centre of the central hub plate, that the second hub plate at its inner periphery also includes a number of tabs extending towards the centre of the hub plate, that the tabs have a geometric shape such that the tabs fit between each other, the tabs including holes arranged at the same pitch circle diameter and at right angles to the tabs.

2. Wheel rim according to claim 1, wherein the central hub plate is designed with at least one bevel shoulder between the contact face on the tabs and the holes for securing to a hub.

3. Wheel rim according to claim 1, wherein the second hub plate is designed with at least one bevel shoulder between contact face on the tabs at the inner periphery and the holes at the outer periphery for direct or indirect joining at the rim ring.

4. Wheel rim according to claim 1, wherein the rim ring and the hub plates are made of steel.

5. Wheel rim according to claim 1, wherein the central hub plate is surface treated by electroplating.

6. Wheel rim according to claim 1, wherein the hub plate further includes an outer hub plate, that the outer hub plate at its outer periphery is fixed to the rim ring and at its inner periphery includes a number of tabs extending towards the centre of the hub plate, that the tabs correspond in number and position to corresponding tabs on outer periphery of the second hub plate, that the tabs have a geometric shape such that the tabs fit between each other, the tabs including holes arranged at the same pitch circle diameter and at right angles to the tabs.

7. A method for making a wheel rim of the type suitable for use on an agricultural or construction vehicle, wherein the rim includes a rim ring for mounting a tire and further including an at least two-part hub plate extending inside the rim ring, where the at least two-part hub plate includes a central hub plate including a number of holes and a contact surface for mechanical and detachable securing to a hub on a vehicle, wherein the central hub plate includes holes on a contact surface at the outer periphery for joining with a second hub plate with an inner periphery and an outer periphery, wherein the second hub plate at the inner periphery includes a contact surface with corresponding holes for joining with the central hub plate, where the second hub plate at the outer periphery includes holes for direct or indirect joining with the rim ring, wherein the central hub plate and the second hub plate are formed of the same work piece as the work piece is machined by a tool suited for the purpose such that the central hub plate is formed with a periphery with a number of projecting tabs, the tabs being formed of the material located between corresponding tabs on the inner periphery of the second hub plate, and that the tabs include holes for joining the central hub plate and the second hub plate.

8. Method for making a wheel rim according to claim 7, wherein furthermore an outer hub plate (11) is formed of the same work piece of which the central hub plate and the second hub plate are formed, that the second hub plate is formed with an outer periphery with a number of projecting tabs, that these tabs are formed of the material located between corresponding tabs on the outer periphery of the outer hub plate, the tabs including holes for joining the two hub plate parts.

9. Method for making wheel rim according to claim 7, wherein the work piece of which the at least two-part hub plate is formed is shaped by pressing or forging, whereby the work piece has achieved an embossing with a concave geometry.

10. Method for making wheel rim according to claim 7, wherein the work piece of which the at least two-part hub plate is formed is plane.

11. Method for making wheel rim according to claim 7, wherein the work piece of which the at least two-part hub plate is formed is shaped, whereby the work piece has achieved an embossing with a concave geometry as well as a convex geometry.

12. Method for making wheel rim according to claim 11, wherein said shaping is performed by one of pressing and forging.

* * * * *